(12) United States Patent
Sung et al.

(10) Patent No.: US 9,456,254 B2
(45) Date of Patent: Sep. 27, 2016

(54) INTERNET PROTOCOL TELEVISION SERVICE

(71) Applicant: KT Corporation, Seongnam-si, Gyeonggi-do (KR)

(72) Inventors: Joo-won Sung, Seoul (KR); Du-seong Chang, Anyang-si (KR)

(73) Assignee: KT Corporation, Seongnam, Gyeonggi-Do (KR)

( * ) Notice: Subject to any disclaimer, the term of this patent is extended or adjusted under 35 U.S.C. 154(b) by 0 days.

(21) Appl. No.: 14/087,399

(22) Filed: Nov. 22, 2013

(65) Prior Publication Data

US 2014/0143809 A1 May 22, 2014

(30) Foreign Application Priority Data

Nov. 22, 2012 (KR) .................. 10-2012-0133219

(51) Int. Cl.

| G06F 3/00 | (2006.01) |
|---|---|
| G06F 13/00 | (2006.01) |
| H04N 5/445 | (2011.01) |
| H04N 21/643 | (2011.01) |
| H04N 21/25 | (2011.01) |
| H04N 21/422 | (2011.01) |
| H04N 21/4223 | (2011.01) |
| H04N 21/472 | (2011.01) |
| H04N 21/4722 | (2011.01) |
| H04N 21/482 | (2011.01) |
| H04N 21/658 | (2011.01) |

(52) U.S. Cl.
CPC ...... *H04N 21/64322* (2013.01); *H04N 21/251* (2013.01); *H04N 21/4222* (2013.01); *H04N 21/4223* (2013.01); *H04N 21/42202* (2013.01); *H04N 21/42203* (2013.01); *H04N 21/4722* (2013.01); *H04N 21/47202* (2013.01); *H04N 21/4826* (2013.01); *H04N 21/6581* (2013.01)

(58) Field of Classification Search
USPC ......................................... 725/37–40, 51, 53
See application file for complete search history.

(56) References Cited

U.S. PATENT DOCUMENTS

| 2006/0101504 A1* | 5/2006 | Aravamudan et al. ........ 725/136 |
| 2008/0307463 A1* | 12/2008 | Beetcher et al. .............. 725/53 |
| 2009/0150433 A1* | 6/2009 | Uusitalo et al. ........... 707/104.1 |
| 2011/0138416 A1* | 6/2011 | Kang et al. .................... 725/39 |
| 2012/0136855 A1* | 5/2012 | Ni et al. ....................... 707/724 |

FOREIGN PATENT DOCUMENTS

| KR | 10-2005-0007367 | 1/2005 |
| KR | 10-2008-0052279 A | 6/2008 |
| KR | 10-2009-0015571 A | 2/2009 |
| KR | 10-0910302 | 8/2009 |
| KR | 10-2010-0081160 A | 7/2010 |
| KR | 10-2012-0087253 | 8/2013 |

\* cited by examiner

*Primary Examiner* — Mulugeta Mengesha
(74) *Attorney, Agent, or Firm* — Brundidge & Stanger, P.C.

(57) ABSTRACT

In one example embodiment, a system includes an end device configured to transmit a user input; and a television apparatus configured to: receive the user input from the end device, determine a query that is associated with a function that is executable by the television apparatus, based at least in part on the user input, execute the function that corresponds to the determined query, and generate a reply to the determined query based at least in part on a result of the execution of the function.

21 Claims, 11 Drawing Sheets

INTERNET PROTOCOL TELEVISION SERVICE

TECHNICAL FIELD

The embodiments described herein pertain generally to an internet protocol television service.

BACKGROUND

An IPTV (Internet Protocol Television) service provider provides a service that integrates security of a telecommunication network, content provided by a broadcast television network and features of the Internet; and further provides voice, data, and video services over one connection simultaneously. Therefore, a user can use a client device to not only make calls, access the Internet, and watch TV, but also enjoy more data, voice, and video integrated services through the IPTV service, serially or in parallel.

SUMMARY

In one example embodiment, a system may include an end device configured to: transmit a user input; and a television apparatus configured to: receive the user input from the end device, determine a query that is associated with a function that is executable by the television apparatus, based at least in part on the user input, execute the function that corresponds to the determined query, and generate a reply to the determined query based at least in part on a result of the execution of the function.

In another example embodiment, a television apparatus may include an input receiver configured to receive a user input; a query manager configured to determine a query that is associated with a function that is executable by the television apparatus, based at least in part on the user input; and a function manager configured to: execute the function that corresponds to the determined query, and generate a reply to the determined query based at least in part on a result of the execution of the function.

In yet another example embodiment, a method performed under control of a television apparatus may include receiving a user input; determining a query that is associated with a function that is executable by the television apparatus based at least in part on the user input; executing the function that corresponds to the determined query; and generating a reply to the determined query based at least in part on a result of the execution of the function.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
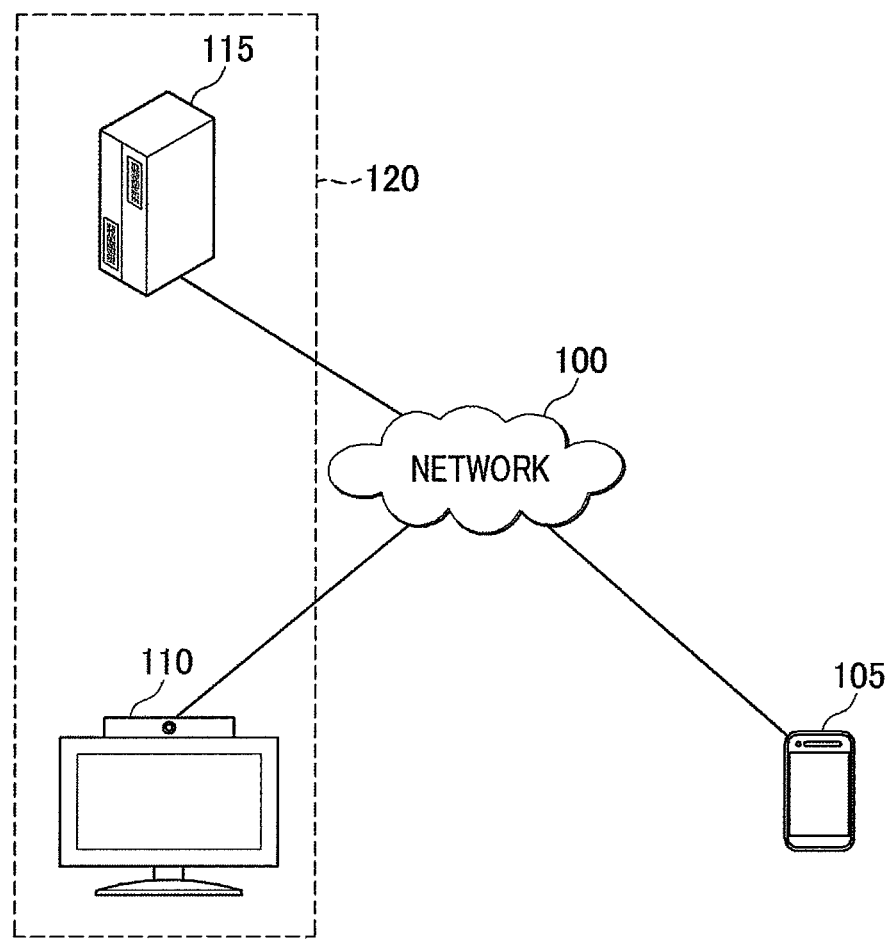
FIG. 1 shows an example system configuration in which one or more embodiments of an internet protocol television service may be implemented, in accordance with various embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration 10 in which one or more embodiments of an internet protocol television service may be implemented, in accordance with various embodiments described herein. As depicted in FIG. 1, system configuration 10 may include, at least, an end device 105, and a television apparatus 120 including a television device 110 and a server 115. At least two or more of end device 105, television device 110, and server 115 may be communicatively connected to each other via a network 100.

Network 100 may include, as non-limiting examples, a wired network such as a LAN (Local Area Network), a WAN (Wide Area Network), a VAN (Value Added Network) or the like, or various other wireless networks such as a mobile radio communication network including at least one of a 3rd generation (3G) mobile telecommunications network, a 4th or 5$^{th}$ generation mobile telecommunications network, various other mobile telecommunications networks, a satellite network, WiBro (Wireless Broadband Internet), Mobile WiMAX, HSDPA (High Speed Downlink Packet Access), or the like. Alternatively, network 100 may include at least one of a near field communication (NFC), Bluetooth, or peer to peer (P2P) communication protocol.

End device 105 may refer to a notebook computer, a personal computer, a smart phone, a remote controller, a tablet computer, a phablet device, or a personal communication terminal, such as PCS (Personal Communication System), GMS (Global System for Mobile communications), PDC (Personal Digital Cellular), PDA (Personal Digital Assistant), IMT (International Mobile Telecommunication)-2000, CDMA (Code Division Multiple Access)-2000, W-CDMA (W-Code Division Multiple Access) and Wibro (Wireless Broadband Internet) terminal.

End device 105 may be configured to transmit at least one signal representing user input to television device 110. Non limiting examples of the user input may include at least one of a voice input, a gesture input, a text input, a pointing input or a touch input. For example, end device 105 may receive a user's voice input that includes a keyword such as "restaurant" to end device 105, and end device 105 may be configured to transmit the voice input including the keyword "restaurant" to television device 110. As another example, end device 105 may receive, from a user thereof, a text input (a typing input) that includes a keyword such as "movie" and a voice input that includes a keyword such as "search", and end device 105 may be configured to transmit the text input including the keyword "movie" and the voice input including the keyword "search" to television device 110.

Television device 110 may refer to any type of a smart television, a set-top box and a display coupled thereto, a notebook computer, a personal computer, a tablet computer, a phablet device, a smart phone, or a personal communication terminal, which are capable of displaying web content and television content.

Television device 110 may be configured to receive the at least one user input from end device 105. With regard to the aforementioned examples pertaining to end device 105, television device may receive the voice input, e.g., "restaurant," from end device 105; or, the combined text input, e.g., "movie," and voice input, e.g., "search," from end device 105.

Further, television device 110 may be configured to determine a query that is associated with at least one function that is executable by television device 110, based at least in part on the received user input and information regarding environmental conditions. Non limiting examples of the information regarding environmental conditions may include at least one of a current time, current or future weather conditions, a location of end device 105, a location of television device 110, or a function execution history regarding functions that were previously executed by television device 100. For example, but not as a limitation, functions that are executable by television device 110 may include searching for content, recommending content, displaying content, displaying an advertisement, recommending a service, and/or searching a map.

In some embodiments, television device 110 may be configured to determine an intention of the user that generated the user input, based at least in part on the received user input and the information regarding environmental conditions. For example, regarding the aforementioned examples, if television device 110 receives the user voice input including the keyword, e.g., "restaurant," from end device 105 at lunch time, television device 110 may be configured to determine that the user of end device 105 wants to search for a restaurant at which the user may eat lunch. Television device 110 may be further configured to then produce a query such as "May I search for a restaurant near you?" based on the determined intention of the user.

Further to the aforementioned example, if television device 110 receives from end device 105 the text input including the keyword, e.g., "movie," and the voice input including the keyword, e.g., "search," and the information regarding environmental conditions indicate that it is currently raining, television device 110 may be configured to infer a mood of the user that matches the current weather conditions to determine that the user of end device 110 wants to see a dramatic or a sad movie or listen to a sound track of a dramatic or sad movie. Television device 110 may be further configured to then produce a query such as "Do you want a sad movie?" based on the determined intention of the user.

Further, television device 110 may be configured to display the produced query on a display that is part of, or communicatively coupled to, television device 110. Further, television device 110 may be configured to determine a display type to display the produced query, and to display the produced query in accordance with the determined display type. Non-limiting examples of the display type may include at least one of a full-screen display, a pop-up display, an additional bar image display, or an avatar display. The additional bar image may refer to a text box or an image box such as a banner. For example, television device 110 may be configured to display a full-screen image that shows the produced query on the display. Further, television device 110 may be configured to introduce a pop-up display image or an additional bar image that shows the query on a certain part of the display. Alternatively, television device 110 may be configured to introduce an avatar image that shows the query on the display.

Further, television device 110 may be configured to select at least one function that corresponds to the produced query from among multiple functions executable by television device 110. For example, but not as a limitation, television device 110 may be configured to select a function that searches for restaurants near end device 105, when the determined query is "May I search for a restaurant near you?" For another example, television device 110 may be configured to select a function that recommends a dramatic movie listing and a function that plays dramatic or sad movie music, when the determined query is "Do you want to watch a dramatic movie?"

Further, television device 110 may be configured to select an appropriate function for execution based at least in part on the information regarding environmental conditions. For example, television device 110 may be configured to select a function that searches for a restaurant that serves ice cream, when television device 110 receives corresponding user input on a hot summer day.

Further, television device 110 may be configured to execute the selected function. In some embodiments, television device 110 may be configured to call at least one function agent that executes the selected function, and to receive a result of the executed function from the at least one function agent. By way of example, but not limitation, the function agent may refer to a module, a processor or an engine that executes a function. Further, the function agent may be located in at least one of television device 110, server 115, or an internet protocol television headend server that is communicatively coupled to television device 110 and/or server 115. The function agent may include at least one of a search agent, a recommendation agent, a content providing agent, or an advertisement agent.

For example, television device 110 may be configured to call a search agent that may be configured to search a map, and to receive a name and a location of a restaurant located near end device 105. As another example, television device 110 may be configured to call a search agent that may be configured to search a map, and to receive a name and a location of a restaurant that serves ice cream, if television device 110 receives the corresponding user input on a hot summer day. For another example, television device 110 may be configured to call a recommendation agent that may be configured to recommend a dramatic movie and a content provider that may be configured to provide dramatic or sad movie music. Television device 110 may be further configured to receive a list of dramatic or sad movies and a uniform resource locator (URL) of a web site to play dramatic or sad movie music.

Further, television device 110 may be configured to generate a reply to the produced query based at least in part on the result of the execution of the function. For example, but not as a limitation, television device 110 may be configured to generate a reply that shows a location of the restaurant near end device 105 and has a heading such as "show restaurant". For another example, television device 110 may be configured to generate a reply that shows a list of dramatic or sad movies and has a heading such as "show a list of dramatic movies" and a reply that indicates a URL of a web site to play dramatic or sad movie music and has a heading such as "dramatic/sad movie list".

In some embodiments, television device 110 may be configured to determine a display type to display the generated reply, and to display the generated reply on a display that is part of, or communicatively coupled to, television device 110 in accordance with the determined display type. Non-limiting examples of the display type may include at least one of a full-screen display, a pop-up display, an additional bar image display, or an avatar display. For example, television device 110 may be configured to display a full-screen image that shows the reply on the display. Further, television device 110 may be configured to introduce a pop-up display or an additional bar image that shows the reply on a certain part of the display. Alternatively, television device 110 may be configured to introduce an avatar image that shows the reply on the display.

Further, television device 110 may be configured to output the generated reply depending on a format or type of received user input. For example, but not as a limitation, television device 110 may be configured to display a text image that shows the reply on the display, if television device 110 received a text type user input. Alternatively, television device 110 may be configured to output the reply in the form of an audio signal, if television device 110 received a voice user input.

In some other embodiments, television device 110 may be configured to determine a type of the determined query and the generated reply. Non-limiting examples of the type of the determined query and the generated reply may include text, an image, an avatar display, or audio. Television device 110 may be further configured to transmit the query and the reply in the same determined type to end device 105. By way of example, but not as a limitation, television device 110 may be configured to transmit, to end device 105, an audio signal to which the query is encoded and an audio signal to which the generated reply is encoded. Then, the audio signals may be decoded by end device 105 and the determined query and the generated reply may be reproduced by end device 105. As another example, television device 110 may be configured to transmit, to end device 105, an image that shows the determined query and an image that shows the generated reply, so the determined query and the generated reply may be displayed on end device 105.

Server 115 may refer to one or more servers hosted and/or supported by a service providing organization or entity that provides real-time broadcasting services, video-on-demand (VOD) services, and/or user interactive services (e.g., games) to end device 105 and television device 110. Server 115 may be one of multiple hosted servers or other processing apparatuses that may be configured to receive at least one user input from at least one of end device 105 or television device 110; to determine a query that is associated with a function that is executable by server 115; to execute the function that corresponds to the determined query; to generate a reply to the determined query based at least in part on a result of the execution of the function; and to transmit the generated reply to at least one of end device 105 or television device 110. Non-limiting examples of server 115 may include an Internet service provider, i.e., ISP; application service provider, i.e., ASP; storage service provider, i.e., SSP; and television service provider, i.e., cable TV, DSL and DBS.

Thus, FIG. 1 shows an example system configuration 10 in which one or more embodiments of an internet protocol television service may be implemented, in accordance with various embodiments described herein.

Figure 2:
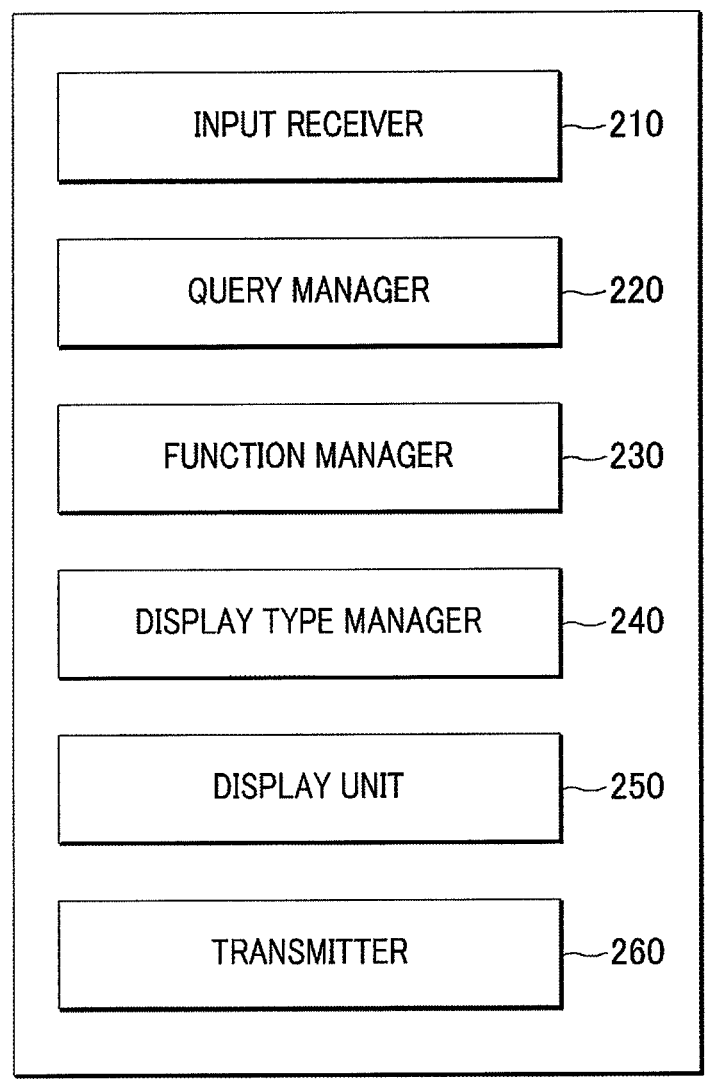
FIG. 2 shows an example configuration of a television device by which at least portions of an internet protocol television service may be implemented, in accordance with various embodiments described herein.

FIG. 2 shows an example configuration of a television device 110 by which at least portions of an internet protocol television service may be implemented, in accordance with various embodiments described herein. As depicted in FIG. 2, television device 110 may include an input receiver 210, a query manager 220, a function manager 230, a display type manager 240, a display unit 250 and a transmitter 260. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of input receiver 210, query manager 220, function manager 230, display type manager 240, display unit 250 and transmitter 260 may be included in an instance of an application hosted on television device 110. Further, one or more of input receiver 210, query manager 220, function manager 230, display type manager 240, display unit 250 and transmitter 260 may be eliminated, if one or more of components that execute the same functions or operations as one or more of input receiver 210, query manager 220, function manager 230, display type manager 240, display unit 250 and transmitter 260 are included in server 115.

Input receiver 210 may be configured to receive at least one user input from end device 105. Non-limiting examples of the user input may include at least one of a voice input, a gesture input, a text input, a pointing input or a touch input. For example, end device 105 may receive a user's text input (a typing input) that includes a keyword such as "movie" and a voice input that includes a keyword such as "search", and input receiver 210 may be configured to receive the text and voice user inputs from end device 105.

Query manager 220 may be configured to produce a query that is associated with at least one function that is executable by television device 110, based at least in part on the at least one user input received by input receiver 210 and, in accordance with at least some embodiments, information regarding environmental conditions. For example, but not as a limitation, the information regarding environmental conditions may include at least one of a current time, current and/or future weather conditions, a location of end device 105, a location of television device 110 or a history of functions that were previously executed by television device 100. Further, a function that is executable by television device 110 may include at least one of searching for content, recommending content, displaying content, displaying an advertisement, recommending a service, searching a map, and so on.

In some embodiments, query manager 220 may be configured to determine an intention of the user that generated the user input, based at least in part on the user input received by input receiver 210 and the information regarding environmental conditions. For example, if input receiver 210 received the text input including the keyword of "movie" and the voice input including the keyword of "search" from end device 105 while it is raining, query manager 220 may be configured to determine that the user of end device 110 wants to search for a dramatic or sad movie or listen to a soundtrack of a dramatic or sad movie. Query manager 220 may be configured to then determine a query such as "Do you want to watch a dramatic or sad movie?" based on the determined intention of the user.

Function manager 230 may be configured to select at least one function that corresponds to the query determined by query manager 220 from multiple functions that are executable by television device 110. For the above example, function manager 230 may be configured to select a function that recommends a dramatic or sad movie list and a function that plays dramatic or sad movie music.

Further, function manager 230 may be configured to execute the selected function. For the above example, function manager 230 may be configured to execute the function that recommends a list of dramatic or sad movies and a function that plays dramatic or sad movie music. Further, function manager 230 may be configured to execute the selected function based at least in part on the information regarding environmental conditions. For example, function manager 230 may be configured to execute a function based at least in part on a history of functions that were previously executed by television device 100. For example, it may be assumed that function manager 230 executed a function that recommends a list of action movies in which a particular actor appears and function manger 230 provided the recommended list to end device 105. Function manager 230 may be configured to then execute a function that recommends a list of dramatic or sad movies in which the particular actor appears.

Further, function manager 230 may be configured to generate a reply to the query based at least in part on a result of the execution of the selected function. For the above example, function manager 230 may be configured to generate a reply that shows a list of dramatic or sad movies and has a heading such as "show a sad movie list" and a reply that indicates a URL of a web site to play sad movie music and has a heading such as "sad movie list".

Display type manager 240 may be configured to determine a display type for displaying the query and the reply. Non-limiting examples of the display type may include at least one of a full-screen display, a pop-up display, an additional bar image display, or an avatar display. Further, display type manager 240 may be configured to determine the display type depending on a type of received user input. For example, but not as a limitation, display type manager 240 may be configured to determine the display type for displaying the query and the reply to be a text that shows the query and the reply on a display, if input receiver 210 received a text user input.

Display unit 250 may be configured to display the query and the reply on a display that is part of or communicatively coupled to television device 110 in accordance with the display type determined by display type manager 240.

Transmitter 260 may be configured to transmit the query determined by query manager 220 and the reply generated by function manager 230 to end device 105. Further, transmitter 260 may be configured to determine a type of the query and the reply. Non-limiting examples of the type of the query and the reply may include at least one of text, an image, an avatar display, or audio. Transmitter 260 may be further configured to transmit the query and the reply that have the determined type to end device 105. By way of example, but not as a limitation, transmitter 260 may be configured to transmit, to end device 105, an audio signal to which the query is encoded and an audio signal to which the generated reply is encoded. Then, the audio signals may be decoded by end device 105 and the determined query and the generated reply may be reproduced by end device 105.

Thus, FIG. 2 shows an example configuration of television device 110 by which at least portions of an internet protocol television service may be implemented, in accordance with various embodiments described herein.

Figure 3:
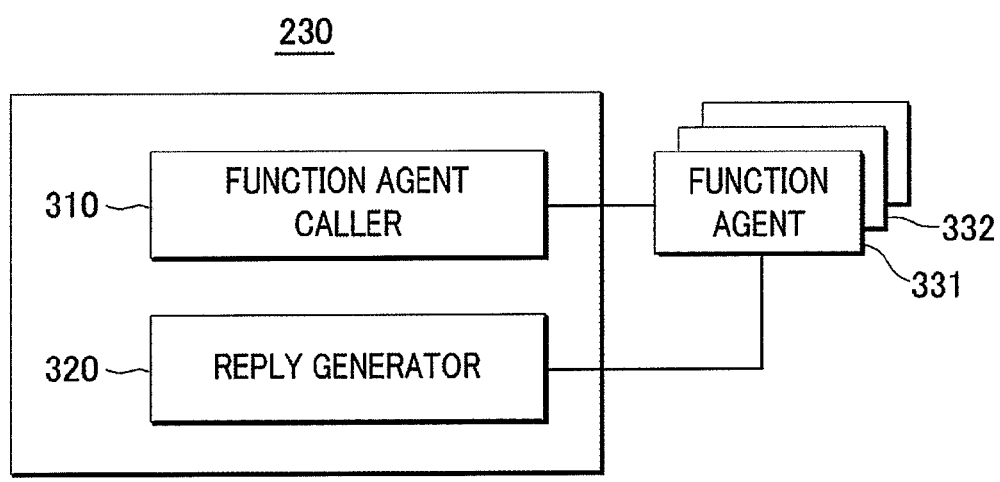
FIG. 3 shows an example configuration of a function manager of a television device by which at least portions of an internet protocol television service may be implemented, in accordance with various embodiments described herein.

FIG. 3 shows an example configuration of function manager 230 of television device 110 by which at least portions of an internet protocol television service may be implemented, in accordance with various embodiments described herein. As depicted in FIG. 3, function manager 230 may include a function agent caller 310 and a reply generator 320. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

Function agent caller 310 may be configured to call at least one function agent 331 or 332 that executes at least one function. By way of example, at least one function agent 331 or 332 may respectively refer to a module, a processor or an engine that executes a function. Function agent 331 or 332 may respectively represent at least one of a searching agent, a recommending agent, a content providing agent, or an advertisement agent. For example, function agent caller 310 may be configured to call recommending agent 331 that may be configured to recommend a sad movie and content providing agent 332 that may be configured to provide sad movie music. Of course, the embodiments described herein are in no way limited to two function agents.

Reply generator 320 may be configured to receive a result of the execution of the at least one function from at least one function agent 331 or 332. By way of example, reply generator 320 may be configured to receive a list of dramatic or sad moves from recommending agent 331, and to receive a uniform resource locator (URL) of a web site to play dramatic or sad movie music from content providing agent 332.

Further, reply generator 320 may be configured to generate a reply to the query based at least in part on the result of the execution of the function. For example, reply generator 320 may be configured to generate a reply that shows the list of sad moves received from recommending agent 331, and to generate a reply that indicates the URL received from content providing agent 332.

Thus, FIG. 3 shows an example configuration of function manager 230 of television device 110 by which at least portions of an internet protocol television service may be implemented, in accordance with various embodiments described herein.

Figure 4:
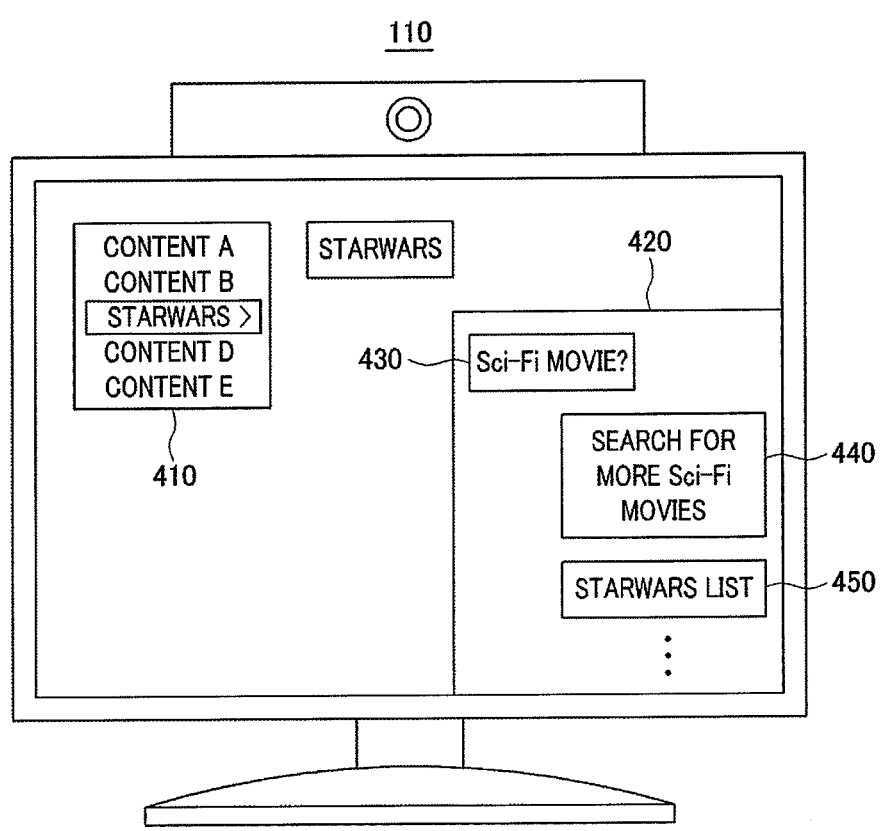
FIG. 4 shows an illustrative example of a television device by which at least portions of an internet protocol television service may be implemented, in accordance with various embodiments described herein.

FIG. 4 shows an illustrative example of television device 110 by which at least portions of an internet protocol television service may be implemented, in accordance with various embodiments described herein. As depicted in FIG. 4, television device 110 may be configured to display a content selecting interface 410 on a display. Television device 110 may be configured to receive a user input that selects a designated content (e.g., Star Wars). For example, but not as a limitation, television device 110 may be configured to receive a touch input to select the designated content or television device 110 may be configured to receive a pointing input to select the designated content from end device 105, e.g., a remote controller or a smart phone.

Further, television device 110 may be configured to determine that the user wants to search a list of science-fiction (Sci-Fi) movies and to listen to a sound track of a science-fiction movie, e.g., Star Wars, based on a keyword of the user input, e.g., Star Wars. Television device 110 may be configured to then determine a query 430 such as "Sci-Fi MOVIE?" based on a determined intention of the user. Further, television device 110 may be configured to display the determined query 430 on a conversation area 420.

Further, television device 110 may be configured to select a function that recommends a sci-fi movie list and a function that plays the sound track of a sci-fi movie, e.g., Star Wars, based on the determined intention of the user. Further, television device 110 may be configured to call a recommendation agent that may be configured to recommend a list of sci-fi movies and a content provider that may be configured to provide the sound track of a sci-fi movie, e.g., Star Wars. Television device 110 may be further configured to receive a list of sci-fi movies from the recommendation agent, and to receive a uniform resource locator (URL) of a web site to play the sound track of the sci-fi movie, e.g., Star Wars, from the content provider.

Further, television device 110 may be configured to generate a reply 440 that shows a list of sci-fi movies and has a heading such as "search for more sci-fi movies" and a reply 450 that indicates a URL of a website to play the sound track of a sci-fi movie, e.g., Star Wars, and has a heading such as "Star Wars list". Further, television device 110 may be configured to display reply 440 and reply 450 on conversation area 420.

Thus, FIG. 4 shows an illustrative example of television device 110 by which at least portions of an internet protocol television service may be implemented, in accordance with various embodiments described herein.

Figure 5A:
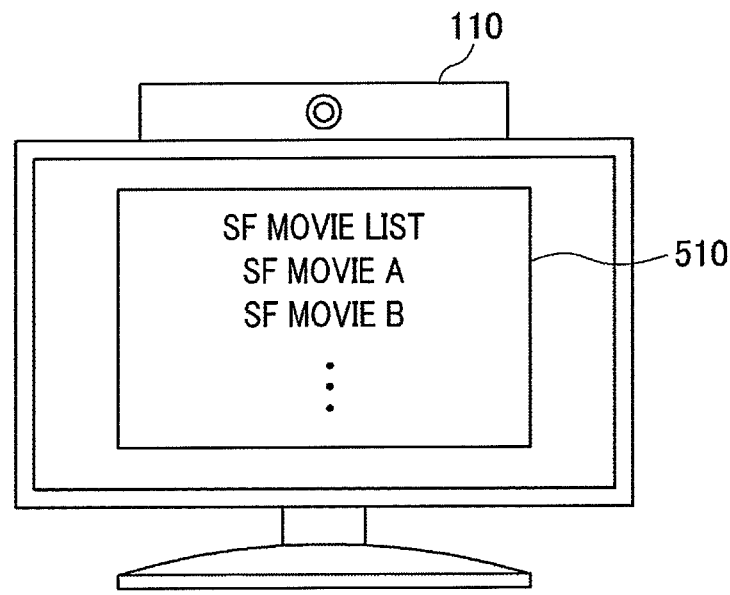
FIGS. 5A to 5E show illustrative examples of a television device by which at least portions of an internet protocol television service may be implemented, in accordance with various embodiments described herein.
Figure 5B:
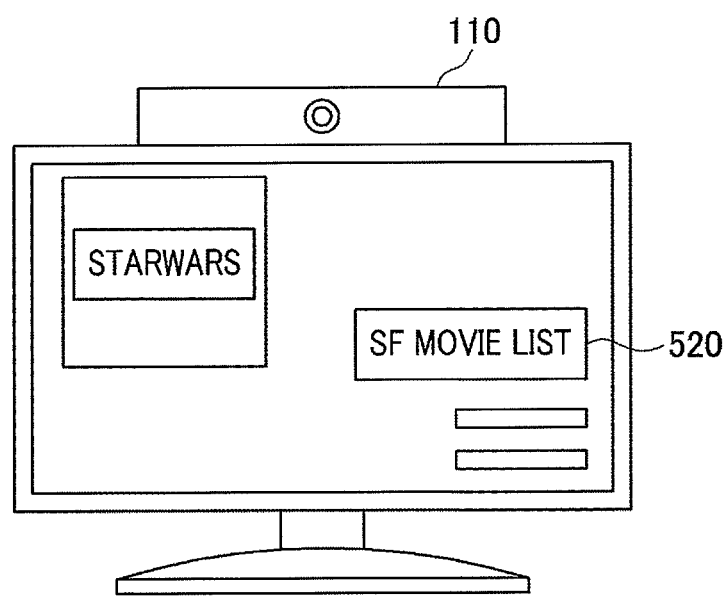
Figure 5C:
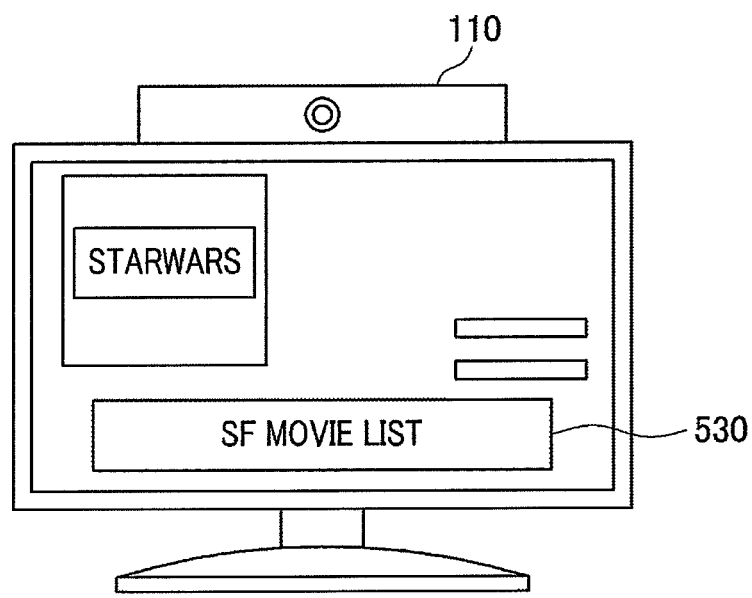
Figure 5D:
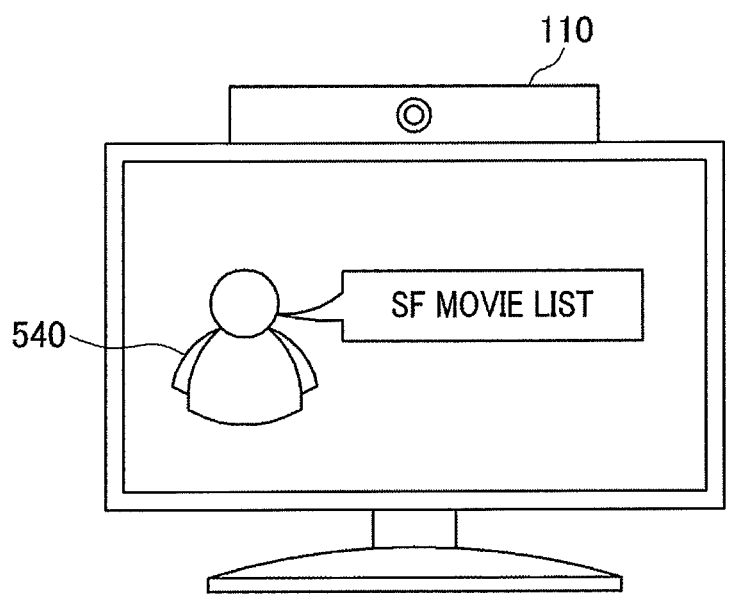
Figure 5E:
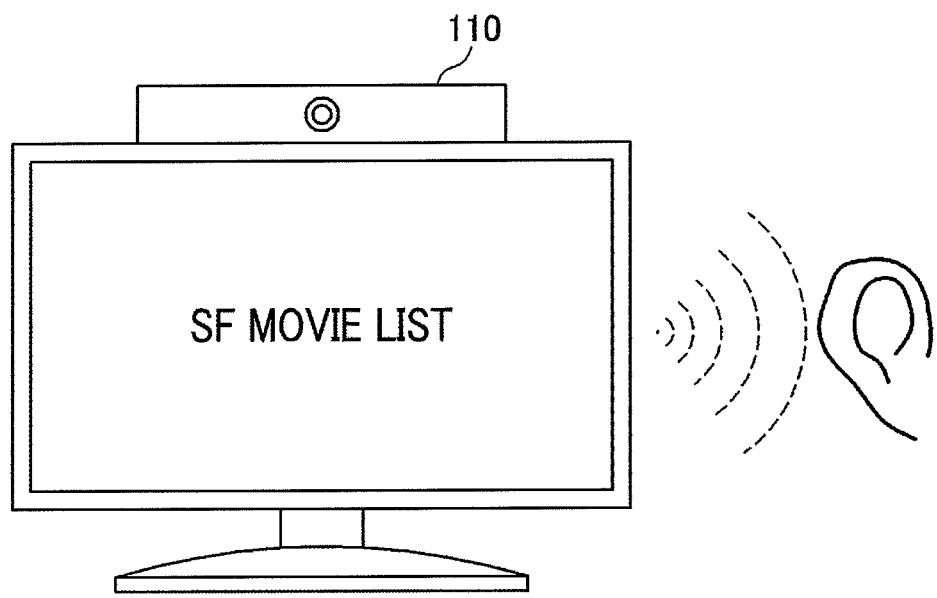

FIGS. 5A to 5E show further illustrative examples of television device 110 by which at least portions of an internet protocol television service may be implemented, in accordance with various embodiments described herein. As depicted in FIG. 5A, television device 110 may be configured to display a full-screen image 510 that shows a reply (e.g., sci-fi movie list) on a display. Further, as depicted in FIG. 5B, television device 110 may be configured to introduce a pop-up display image 520 that shows the reply (e.g., sci-fi movie list) on the display. Further, as depicted in FIG. 5C, television device 110 may be configured to introduce an additional bar image 530 that shows the reply (e.g., sci-fi movie list) on the display. Further, as depicted in FIG. 5D, television device 110 may be configured to introduce an avatar image 540 that shows the reply (e.g., sci-fi movie list) on the display. Further, as depicted in FIG. 5E, television device 110 may be configured to play a voice that speaks the reply (e.g., sci-fi movie list).

Thus, FIGS. 5A to 5E show illustrative examples of television device 110 by which at least portions of an internet protocol television service may be implemented, in accordance with various embodiments described herein.

Figure 6:
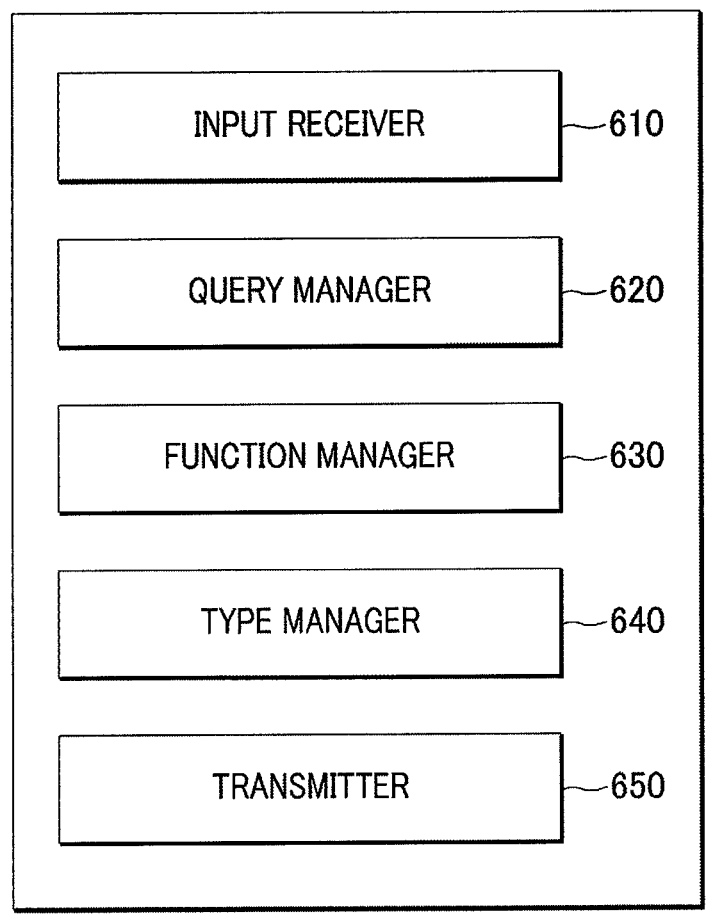
FIG. 6 shows an example configuration of a server by which at least portions of an internet protocol television service may be implemented, in accordance with various embodiments described herein.

FIG. 6 shows an example configuration of server 115 by which at least portions of an internet protocol television service may be implemented, in accordance with various embodiments described herein. As depicted in FIG. 6, server 115 may include an input receiver 610, a query manager 620, a function manager 630, a type manager 640 and a transmitter 650. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof. In that regard, one or more of input receiver 610, query manager 620, function manager 630, type manager 640 and transmitter 650 may be included in an instance of an application hosted on server 115. Further, one or more of input receiver 610, query manager 620, function manager 630, type manager 640 and transmitter 650 may be eliminated, if one or more of components that execute the same functions or operations as one or more of input receiver 610, query manager 620, function manager 630, type manager 640 and transmitter 650 are included in television device 110.

Input receiver 610 may be configured to receive at least one user input from at least one of end device 105 and television device 110. Non-limiting examples of the user input may include at least one of voice input, gesture input, text input, pointing input or touch input.

Query manager 620 may be configured to determine an intention of a user from which the user input was received, based at least in part on the user input received by input receiver 610 and information regarding environmental conditions. For example, but not as a limitation, the information regarding environmental conditions may include at least one of a current time, current and/or future weather conditions, a location of television device 110, a location of end device 105 or a history of functions that were previously executed by server 115.

Further, query manager 620 may be configured to determine and produce a query associated with at least one function that is executable by server 115, based at least in part on the at least one user input received by input receiver 610, the determined intention of the user and the information regarding environmental conditions. For example, but not as a limitation, the function that is executable by server 115 may include searching for content, recommending content, displaying content, displaying an advertisement, recommending a service, and/or searching a map.

Function manager 630 may be configured to select at least one function that corresponds to the query determined by query manager 620 from among multiple functions executable by server 115. Further, function manager 630 may be configured to execute the selected function. In some embodiments, function manager 630 may be configured to call at least one function agent that executes the at least one selected function, and to receive a result of the executed function. Further, function manager 630 may be configured to generate a reply to the query based at least in part on a result of the executed function.

Type manager 640 may be configured to determine a type of the query and the reply. Non-limiting examples of the type may include at least one of a full-screen display, a pop-up display, an additional bar image display, an avatar display, or audio. Further, type manager 640 may be configured to determine the type depending on a type of the at least one user input. For example, but not as a limitation, display type manager 240 may be configured to determine the type for displaying the query and the reply to be a text image type, if input receiver 610 received a text user input.

Transmitter 650 may be configured to transmit the query determined by query manager 620 and the reply generated by function manager 630 to at least one of end device 105 or television device 110.

Thus, FIG. 6 shows an example configuration of server 115 by which at least portions of an internet protocol television service may be implemented, in accordance with various embodiments described herein.

Figure 7:
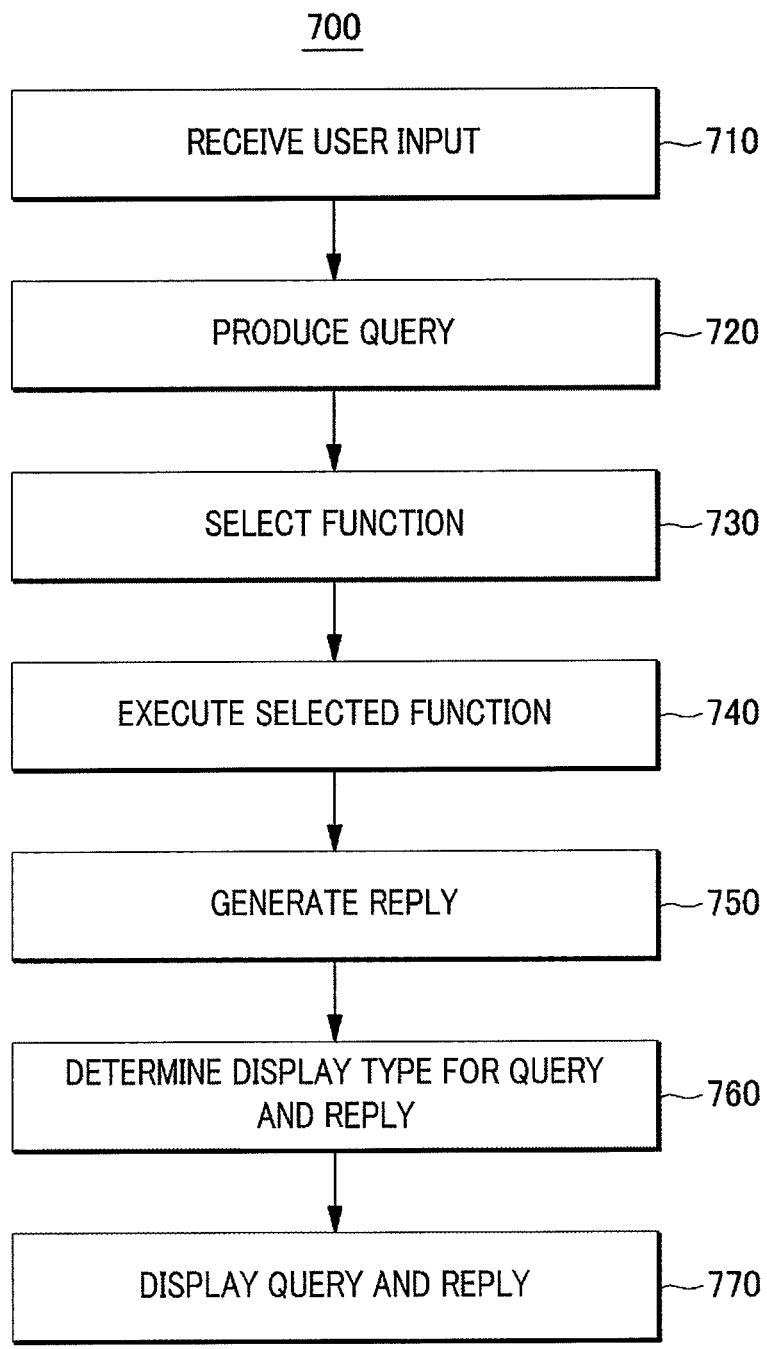
FIG. 7 shows an example processing flow of operations by which at least portions of an internet protocol television service may be implemented, in accordance with various embodiments described herein.

FIG. 7 shows an example processing flow 700 of operations by which at least portions of an internet protocol television service may be implemented, in accordance with various embodiments described herein. The operations of processing flow 700 may be implemented in television device 110 including input receiver 210, query manager 220, function manager 230, display type manager 240, display unit 250 and transmitter 260, as illustrated in FIG. 2. Processing flow 700 may include one or more operations, actions, or functions as illustrated by one or more blocks 710, 720, 730, 740, 750, 760 and/or 770. Although illustrated as discrete blocks, various blocks may be divided into additional blocks, combined into fewer blocks, or eliminated, depending on the desired implementation. Processing may begin at block 710.

Block 710 (Receive User Input) may refer to input receiver 210 receiving at least one user input from end device 105. Non-limiting examples of the user input may include at least one of a voice input, a gesture input, a text input, a pointing input or a touch input. For example, end device 105 may receive, from a user of end device 105, a text input (a typing input) that includes a keyword such as "movie" and a voice input that includes a keyword such as "search". Input receiver 210 may receive the two user inputs from end device 105. Processing may proceed from block 710 to block 720.

Block 720 (Produce Query) may refer to query manager 220 producing a query associated with at least one function that is executable by television device 110, based at least in part on the at least one user input received at block 710 and information regarding environmental conditions. For example, but not as a limitation, the environment information may include at least one of a current time, current and/or future weather conditions, a location of television device 110, a location of end device 105 or a history of functions that were previously executed by television device 100. Further, the function may include at least one of searching for content, recommending content, displaying content, displaying an advertisement, recommending a service, searching a map and so on.

In some embodiments, at block 720, query manager 220 may determine an intention of the user that generated the user input, based at least in part on the user input received at block 710 and, in accordance with at least some examples, the information regarding environmental conditions. For the above example, if input receiver 210 received text input including the keyword "movie" and voice input including the keyword of "search" from end device 105 at night, query manager 220 may determine that the user of end device 110 wants to search for a horror movie or listen to a sound track of a horror movie. Then, query manager 220 may determine and produce a query such as "Do you want a horror movie?" based on the determined intention of the user. Processing may proceed from block 720 to block 730.

Block 730 (Select Function) may refer to function manager 230 selecting at least one function that corresponds to the query produced at block 720 from among multiple functions executable by television device 110. For the above example, function manager 230 may select a function that recommends a horror movie list and a function that plays horror movie music. Processing may proceed from block 730 to block 740.

Block 740 (Execute Selected Function) may refer to function manager 230 executing the at least one function selected at block 730. For the above example, function manager 230 may execute the function that recommends a horror movie list and the function that plays horror movie music. In some embodiments, function manager 230 may call at least one function agent that executes the at least one function selected at block 730. For the above example, function manager 230 may call a recommendation agent that may be configured to recommend a horror movie and a content provider that may be configured to provide horror movie music. Processing may proceed from block 740 to block 750.

Block 750 (Generate Reply) may refer to function manager 230 generating a reply to the query based at least in part on a result of the execution of the at least one function. In some embodiments, function manager 230 may receive a result of the execution of the at least one function from the at least one function agent called at block 740. For the above example, function manager 230 may receive a list of horror moves from the recommendation agent, and receive a uniform resource locator (URL) of a web site that plays horror movie music from the content provider. Further, function manager 230 may generate a reply that shows a list of horror movies and has a heading such as "show a horror movie list" and a reply that indicates a URL of a web site that plays horror movie music and has a heading such as "horror movie list". Processing may proceed from block 750 to block 760.

Block 760 (Determine Display Type of Query and Reply) may refer to display type manager 240 determining a display type for displaying the query and the reply. Non-limiting examples of the display type may include at least one of a full-screen display, a pop-up display, an additional bar image display, or an avatar display. In some embodiments, display type manager 240 may determine the display type depending on a kind of a received user input. For the above example, display type manager 240 may determine the display type for displaying the query and the reply to be a text image that shows the query and the reply on a display, since input receiver 210 received a text user input at block 710. Processing may proceed from block 760 to block 770.

Block 770 (Display Query and Reply) may refer to display unit 250 displaying the query and the reply on a display that is communicatively coupled to television device 110 in accordance with the display type determined at block 760.

Thus, FIG. 7 shows an example processing flow 700 of operations by which at least portions of an internet protocol television service may be implemented, in accordance with various embodiments described herein.

Figure 8:
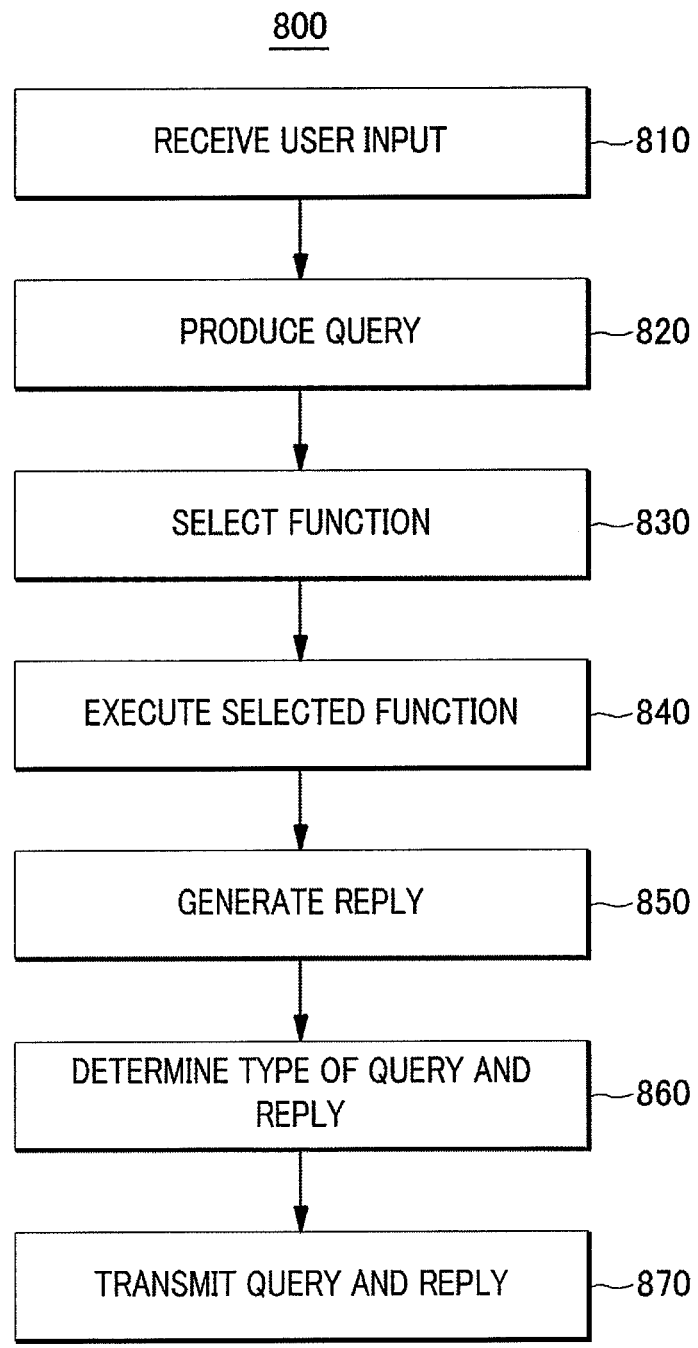
FIG. 8 shows another example processing flow of operations by which at least portions of an internet protocol television service may be implemented, in accordance with various embodiments described herein.

FIG. 8 shows another example processing flow 800 of operations by which at least portions of an internet protocol television service may be implemented, in accordance with various embodiments described herein. The operations of processing flow 800 may be implemented in television device 110 including input receiver 210, query manager 220, function manager 230, display type manager 240, display unit 250 and transmitter 260, as illustrated in FIG. 2. Processing flow 800 may include one or more operations, actions, or functions as illustrated by one or more blocks 810, 820, 830, 840, 850, 860 and/or 870. Although illustrated as discrete blocks, various blocks may be divided into additional blocks, combined into fewer blocks, or eliminated, depending on the desired implementation. Processing may begin at block 810.

Block 810 (Receive User Input) may refer to input receiver 210 receiving at least one user input from end device 105. Non-limiting examples of the user input may include at least one of voice input, gesture input, text input, pointing input or touch input. For example, end device 105 may receive, from a user of end device 105, a text input (a typing input) that includes a keyword such as "movie" and a voice input that includes a keyword such as "search". Input receiver 210 may receive the two user inputs from end device 105. Processing may proceed from block 810 to block 820.

Block 820 (Produce Query) may refer to query manager 220 determining and producing a query associated with at least one function that is executable by television device 110, based at least in part on the at least one user input received at block 810 and information regarding environmental conditions. For example, but not as a limitation, the information regarding environmental conditions may include at least one of a current time, current and/or future weather conditions, a location of television device 110, a location of end device 105 or a function execution history regarding functions that were previously executed by television device 100. Further, the at least one function that is executable by television device 110 may include at least one of searching for content, recommending content, displaying content, displaying an advertisement, recommending a service, or searching a map.

In some embodiments, at block 820, query manager 210 may determine an intention of the user that generated the user input, based at least in part on the user input received at block 810 and, in accordance with at least some embodiments, the information regarding environmental condition. For the above example, if input receiver 210 received the text input including the keyword of "movie" and the voice input including the keyword of "search" from end device 105 while it is raining, query manager 220 may determine that the user of end device 110 wants to search for a dramatic or sad movie or listen to a sound track of a dramatic or sad movie. Then, query manager 220 may determine and produce a query such as "Do you want a dramatic or sad movie?" based on the determined intention of the user. Processing may proceed from block 820 to block 830.

Block 830 (Select Function) may refer to function manager 230 selecting at least one function that corresponds to the query determined at block 820 from among multiple functions executable by television device 110. For the above example, function manager 230 may select a function that recommends a list of dramatic or sad movies and a function that plays dramatic or sad movie music. Processing may proceed from block 830 to block 840.

Block 840 (Execute Selected Function) may refer to function manager 230 executing the at least one function selected at block 830. For the above example, function manager 230 may execute the function that recommends a dramatic or sad movie list and the function that plays dramatic or sad movie music. In some embodiments, function manager 230 may call at least one function agent that executes the at least one function selected at block 830. For the above example, function manager 230 may call a recommending agent that may be configured to recommend a dramatic or sad movie and a content provider that may be configured to provide sad movie music. Processing may proceed from block 840 to block 850.

Block 850 (Generate Reply) may refer to function manager 230 generating a reply to the query based at least in part on a result of the execution of the at least one function. In some embodiments, function manager 230 may receive a result of the execution of the at least one function from the at least one function agent called at block 840. For the above example, function manager 230 may receive a list of sad moves from the recommending agent, and receive a uniform resource locator (URL) of a web site to play dramatic or sad movie music from the content provider. Further, function manager 230 may generate a reply that shows a list of dramatic or sad movies and has a heading such as "show a list of dramatic or sad movies" and a reply that informs a URL of a web site to play dramatic or sad movie music and has a heading such as "sad movie list". Processing may proceed from block 850 to block 860.

Block 860 (Determine Type of Query and Reply) may refer to display type manager 240 determining a type of the query and the reply. Non-limiting examples of the type may include at least one of a full-screen display, a pop-up display, an additional bar image display, an avatar display, or audio. In some embodiments, display type manager 240 may determine the type depending on a kind of the at least one user input. For the above example, display type manager 240 may determine the type of the query and the reply to be a text image that shows the query and the reply on a display, since input receiver 210 received a text user input at block 810. Processing may proceed from block 860 to block 870.

Block 870 (Transmit Query and Reply) may refer to transmitter 260 transmitting the query determined at block 820 and the reply generated at block 850 to end device 105. For the above example, transmitter 260 may transmit the text image query and the text image reply to end device 105, and the query and the reply are displayed on end device 105.

Thus, FIG. 8 shows another example processing flow 800 of operations by which at least portions of an internet protocol television service may be implemented, in accordance with various embodiments described herein.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 9:
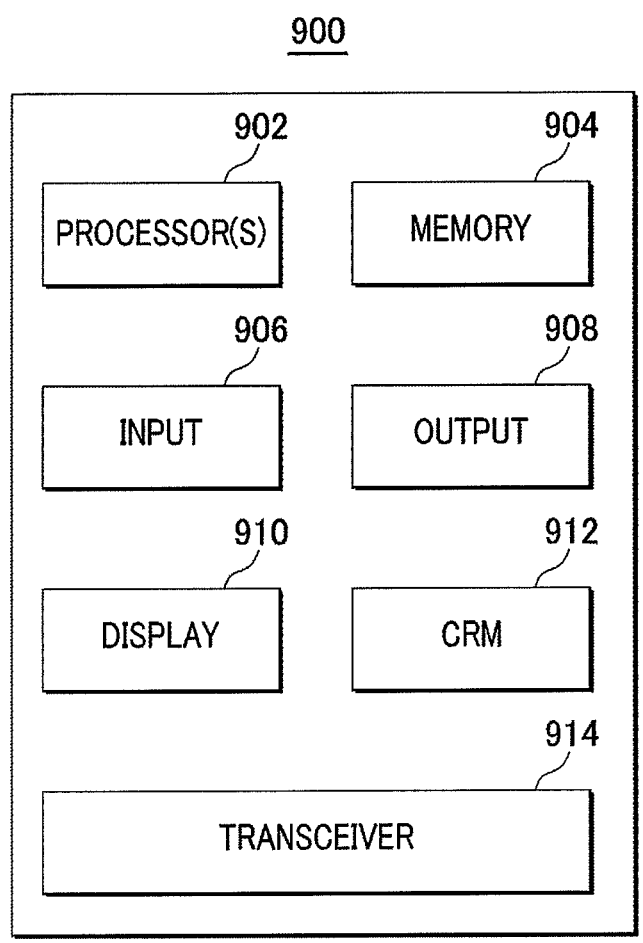
FIG. 9 shows an illustrative computing embodiment, in which any of the processes and sub-processes of an internet protocol television service may be implemented as computer-readable instructions stored on a computer-readable medium, in accordance with various embodiments described herein.

FIG. 9 shows an illustrative computing embodiment, in which any of the processes and sub-processes of an internet protocol television service may be implemented as computer-readable instructions stored on a computer-readable medium, in accordance with various embodiments described herein. The computer-readable instructions may, for example, be executed by a processor of a device, as referenced herein, having a network element and/or any other device corresponding thereto, particularly as applicable to the applications and/or programs described above corresponding to the configuration 10 for transactional permissions.

In a very basic configuration, a computing device 900 may typically include, at least, one or more processors 902, a system memory 904, one or more input components 906, one or more output components 908, a display component 910, a computer-readable medium 912, and a transceiver 914.

Processor 902 may refer to, e.g., a microprocessor, a microcontroller, a digital signal processor, or any combination thereof.

Memory 904 may refer to, e.g., a volatile memory, non-volatile memory, or any combination thereof. Memory 904 may store, therein, an operating system, an application, and/or program data. That is, memory 904 may store executable instructions to implement any of the functions or operations described above and, therefore, memory 904 may be regarded as a computer-readable medium.

Input component 906 may refer to a built-in or communicatively coupled keyboard, touch screen, or telecommunication device. Alternatively, input component 906 may include a microphone that is configured, in cooperation with a voice-recognition program that may be stored in memory 904, to receive voice commands from a user of computing device 900. Further, input component 906, if not built-in to computing device 900, may be communicatively coupled thereto via short-range communication protocols including, but not limitation, radio frequency or Bluetooth.

Output component 908 may refer to a component or module, built-in or removable from computing device 900, that is configured to output commands and data to an external device.

Display component 910 may refer to, e.g., a solid state display that may have touch input capabilities. That is, display component 910 may include capabilities that may be shared with or replace those of input component 906.

Computer-readable medium 912 may refer to a separable machine readable medium that is configured to store one or more programs that embody any of the functions or operations described above. That is, computer-readable medium 912, which may be received into or otherwise connected to a drive component of computing device 900, may store executable instructions to implement any of the functions or operations described above. These instructions may be complimentary or otherwise independent of those stored by memory 904.

Transceiver 914 may refer to a network communication link for computing device 900, configured as a wired network or direct-wired connection. Alternatively, transceiver 914 may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A system, comprising:
an end device configured to transmit a user input; and
a television apparatus configured to:
receive the user input from the end device,
determine an intention of a user that generated the user input, based at least in part on the user input and at least one of current or future weather conditions at a current location of the end device, or a location of the television apparatus,
generate a query that includes at least one word based at least in part on the determined intention of the user,
select at least one function that corresponds to the generated query from among multiple functions that are executable by the television apparatus,
execute the selected function, and
generate a reply to the generated query based at least in part on a result of the execution of the selected function.

2. The system of claim 1, wherein the user input includes at least one of a voice, a gesture, a text, a touch, or a pointer.

3. The system of claim 1, wherein the at least one function includes at least one of searching for content, recommending content, displaying content, displaying an advertisement, recommending a service, or searching a map.

4. The system of claim 1, wherein the television apparatus is further configured to transmit the generated reply to the end device, and
wherein the end device is further configured to:
receive the transmitted reply from the television apparatus, and
display the received reply.

5. The system of claim 1, wherein the television apparatus is further configured to display the generated query and the generated reply.

6. A television apparatus, comprising:
an input receiver configured to receive a user input;
a query manager configured to:
determine an intention of a user that generated the user input based at least in part on the user input and at least one of current or future weather conditions, or a location of the television apparatus, and
generate a query that includes at least one word, based at least in part on the determined intention of the user; and
a function manager configured to:
select at least one function that corresponds to the generated query from among multiple functions that are executable by the television apparatus,
execute the selected function that corresponds to the determined query, and
generate a reply to the determined query based at least in part on a result of the execution of the selected function.

7. The television apparatus of claim 6, further comprising:
a display unit configured to display the generated query and the generated reply.

8. The television apparatus of claim 7, further comprising:
a display type manager configured to determine a display type for the generated reply, wherein the display unit is configured to display the generated reply in accordance with the determined display type, and wherein the display type includes at least one of a full-screen display type, a pop-up display type, an additional bar image display type, or an avatar display type.

9. The television apparatus of claim 6, wherein the input receiver is further configured to receive the user input from an end device, and wherein the television apparatus further comprises: a transmitter configured to transmit the generated reply to the end device.

10. The television apparatus of claim 6, wherein the query manager is configured to determine the intention of the user further based at least in part on a current time, or a function execution history regarding functions that were previously executed by the television apparatus.

11. The television apparatus of claim 6, wherein the at least one function includes at least one of searching for content, recommending content, displaying content, displaying an advertisement, recommending a service, or searching a map.

12. The television apparatus of claim 6, wherein the function manager executes the function by:

calling at least one function agent that executes the selected function, and receiving the result of the execution of the selected function from the at least one function agent.

13. The television apparatus of claim 6, wherein the function manager is configured to execute the selected function based at least in part on environment information that includes at least one of a current time, or a function execution history regarding functions that were previously executed by the television apparatus.

14. The television apparatus of claim 6, wherein the user input includes at least one of a voice, a gesture, a text, a touch, or a pointer.

15. The television apparatus of claim 14, further comprising:

a display unit configured to display the generated reply depending on a type of the user input.

16. A method performed under control of a television apparatus, comprising:

receiving a user input;

determining an intention of a user that generated the user input, based at least in part on the user input and at least one of current or future weather conditions, or a location of the television apparatus;

generating a query that includes at least one word based at least in part on the determined intention of the user;

selecting at least one function that corresponds to the generated query from among multiple functions that are executable by the television apparatus;

executing the selected function that corresponds to the determined query; and generating a reply to the generated query based at least in part on a result of the execution of the selected function.

17. The method of claim 16, further comprising:

determining a display type for the generated reply; and displaying the generated query and the generated reply based at least in part on the determined display type, wherein the display type includes at least one of a full-screen display type, a pop-up display type, an additional bar image display type, or an avatar display type.

18. The method of claim 16, wherein the determining of the intention of the user is further based at least in part on at least one of a current time or a function execution history regarding functions that were previously executed by the television apparatus, and wherein the selected function includes at least one of searching for content, recommending content, displaying content, displaying an advertisement, recommending a service, or searching a map.

19. The method of claim 16, wherein the executing includes:

calling a function agent that executes the selected function, and wherein the method further comprises: receiving the result of the execution of the function from the function agent.

20. The method of claim 16, further comprising:

displaying the generated query and the generated reply depending on a type of the user input, wherein the user input includes at least one of a voice, a gesture, a text, a touch, or a pointer.

21. The system of claim 1, wherein the television apparatus is configured to determine the intention of the user further based at least in part on the current location of the end device.

* * * * *